United States Patent [19]
Vattakattu et al.

[11] Patent Number: 5,269,179
[45] Date of Patent: Dec. 14, 1993

[54] VEHICLE TESTING APPARATUS

[75] Inventors: George T. Vattakattu, Dearfield, Ill.; Edwin Katt, Kenosha, Wis.

[73] Assignee: Frank L. Wells Company, Kenosha, Wis.

[21] Appl. No.: 795,175

[22] Filed: Nov. 18, 1991

[51] Int. Cl.⁵ .......................................... G01M 19/00
[52] U.S. Cl. .................................... 73/117; 73/862.16
[58] Field of Search ............... 73/117, 862.12, 862.13, 73/126, 862.16

[56] References Cited

U.S. PATENT DOCUMENTS

| | | | |
|---|---|---|---|
| 3,364,736 | 1/1968 | Bathurst et al. | 73/862.16 |
| 3,453,874 | 7/1969 | Cline | 73/862.13 |
| 5,000,038 | 3/1991 | Katt | 73/117 |
| 5,003,829 | 4/1991 | De Conti et al. | 73/862.12 |

FOREIGN PATENT DOCUMENTS 27235  8/1971  Japan ............................. 73/862.13

*Primary Examiner*—Jerry W. Myracle
*Attorney, Agent, or Firm*—Michael, Best & Friedrich

[57] ABSTRACT

Disclosed herein is a vehicle testing apparatus comprising a pair of brake clipers operable in response to the application of pressure fluid for applying torque in opposition to driving torque delivered by the driving wheels of a vehicle operating at a given speed, a force sensor for sensing differential in the driving and applied torque, a control for generating a signal representative of the torque differential, and a pressure regulator for maintaining the applied torque at a constant magnitude by regulating the pressure of the fluid applied to the brake calipers.

14 Claims, 2 Drawing Sheets

5,269,179

VEHICLE TESTING APPARATUS

RELATED INVENTION

Attention is directed to U.S. Pat. No. 5,000,038, which issued Mar. 19, 1991, and which is incorporated herein by reference.

BACKGROUND OF THE INVENTION

The invention relates generally to vehicle testing apparatus and, more particularly, to road test simulators used in connection with environmental testing of vehicle exhaust emissions.

Such emission testing measures the chemical content of the exhaust emissions which can vary in accordance with engine load and speed. In order to eliminate such variations and to provide testing standards, such emission content testing is preferably conducted under conditions of constant load and speed.

SUMMARY OF THE INVENTION

The invention provides a vehicle testing apparatus comprising means operable in response to the application of pressure fluid for applying torque in opposition to driving torque delivered by the driving wheels of a vehicle operating at a given speed, means for sensing differential in the driving and applied torque, means for generating a signal representative of the torque differential, and means for maintaining the applied torque at a constant magnitude by regulating the pressure of the applied fluid.

In one embodiment of the invention, the torque applying means comprises a frame, a roller rotatably supported by the frame, adapted to be engaged by one of the driving wheels and to be rotatably driven incident to receipt of driving torque transmitted by the one driving wheel, and a pressure fluid actuated device operable to apply torque in opposition to the rotation of the driven roller.

In one embodiment of the invention, the differential sensing and signal generating means comprises a bracket pivotally supported by the frame, carrying the pressure fluid actuated device, and including a force transmitting stud, and a force sensor stationarily mounted on the frame in position for engagement by the stud for generating a signal representative of the differential or out-of-balance condition between the driving torque and the applied torque.

In one embodiment of the invention, the torque differential sensing means further comprises a disk rotatably driven by the driven roller at a speed proportional to the rate of vehicle wheel rotation, and the pressure fluid actuated device is an air pressure brake caliper which applies friction to the disk.

In one embodiment of the invention, the means for maintaining the applied torque at a constant magnitude includes a source of pressure air, a signal-operated pressure regulator operably connected between the pressure source and the brake caliper, and an electronic control receiving the torque differential signal and including means for generating, in response to receipt of the torque differential signal, a feedback signal which is applied to the pressure regulator.

In one embodiment of the invention, the vehicle testing apparatus comprising a frame, a pair of rollers rotatably supported by the frame, adapted to be respectively engaged by a pair of driving wheels of a vehicle, to be rotatably driven incident to receipt of driving torque transmitted by the driving wheels, and coupled to each other for common rotation, a pair of disks respectively rotatably driven by the driven rollers at a speed proportional to the rate of driving wheel rotation, a pair of pressure air actuated brake calipers respectively engaging the disks to frictionally apply torque in opposition to the rotation of the driven rollers, a bracket pivotally supported by the driven rollers, carrying the brake calipers, and including a force transmitting stud, a force sensor stationarily mounted on the frame in position for engagement by the stud for generating a signal representative of the out-of-balance condition between the driving torque and the applied torque, a source of pressure air, a signal-operated pressure regulator operably connected between the pressure source and the brake calipers, and an electronic control receiving the out-of-balance signal from the sensor and including means for generating, in response to receipt of the signal from the sensor, a feedback signal which is applied to the pressure regulator, whereby to maintain the applied torque at a constant magnitude.

In one embodiment of the invention, the electronic control includes an adjustable reference to which the out-of-balance signal is compared.

In one embodiment of the invention, the electronic control includes a plurality of references, and means for selecting one of the references.

Other features and advantages of the intention will become apparent to those skilled in the art upon review of the following detailed description, claims, and drawings.

THE DRAWINGS

FIG. 1' is partially schematic plan view of a vehicle testing apparatus which incorporates various of the features of the invention.

Figure 1:
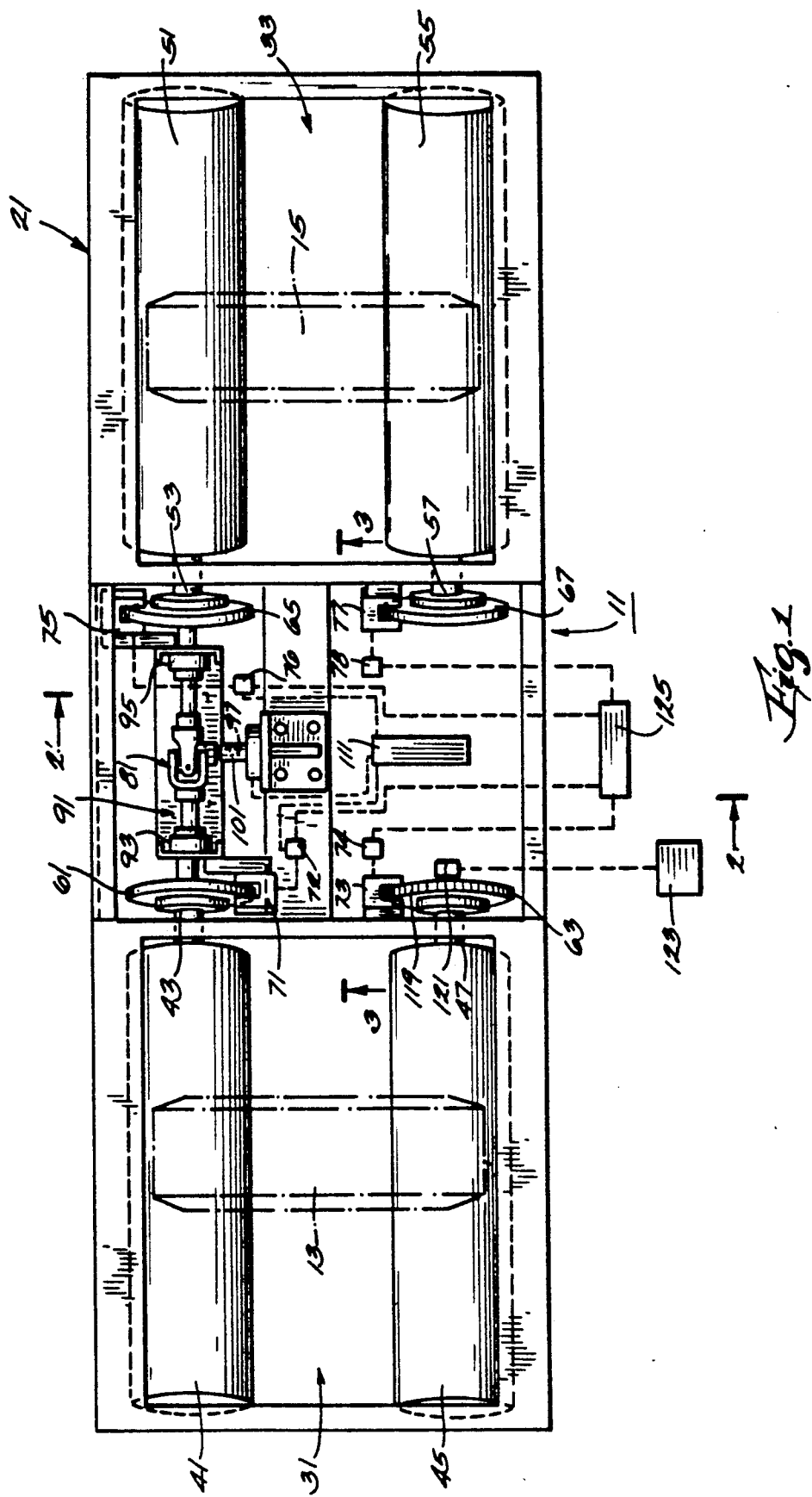

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

BRIEF DESCRIPTION OF PREFERRED EMBODIMENT

Shown in the drawings is a vehicle testing apparatus 11 which is especially adapted for applying a constant torque to the drive or driving wheels 13 and 15 (shown in dotted outline) of an automobile vehicle (not shown), such as an automobile or truck, which wheels are spaced apart and aligned for rotation about a common axis.

In general, the apparatus 11 comprises a frame 21, which can be of any suitable construction and can be located in a pit. In addition, the apparatus 11 includes means, operable in response to the application of pressure fluid, for applying a torque or load in opposing relation to a driving load or torque delivered by the driving wheels 13 and 15 of the vehicle, means for sensing differential between the driving torque and the applied torque or load and for generating a signal representative of or proportional to the differential between the driven load and the applied or opposing load, and means for maintaining the opposing load or torque constant by regulating the pressure applied to the torque applying means.

While other pressure fluid actuated arrangements can be employed, in the particularly disclosed construction, the apparatus 11 operates to apply a torque or load which frictionally opposes rotation of the vehicle wheels 13 and 15 and which results from the application of pressure fluid, such as pressure air. As a consequence, variation in the pressure of the applied air serves to vary the load applied to the vehicle wheels 13 and 15. Arrangements for adjustably applying frictional loads in opposition to the rotation of driving vehicle wheels are known in the industry and are also disclosed in U.S. Pat. No. 5,000,038, which is incorporated herein by reference. Accordingly, it is believed to be unnecessary to further disclose such arrangements in detail except to indicate that, in the past, such torque applying devices have been referred to as brake calipers.

While other constructions and arrangements can be employed, in the disclosed construction, the vehicle testing apparatus 11 also includes first and second roller units 31 and 33 respectively adapted to receive, and to be engaged by the pair of drive wheels 13 and 15.

The first roller unit 31 includes a pair of aligned rollers including a first roller 41 which is suitably rotatably supported by the frame 21 in inclined relation to the horizontal and which is connected to a first output shaft 43 for common rotation. The first roller unit 31 also includes a second roller 45 which is suitably supported by the frame 21 in spaced parallel relation to the first roller 41 and in parallel inclined relation to the horizontal and which is also suitably connected to a second output shaft 47 for common rotation therewith.

The second roller unit 33 also includes a second pair of rollers 51 and 55 which are suitably supported by the frame 21 in spaced parallel and inclined relation to the horizontal and which are connected to respective output shafts 53 and 57 for common rotation.

The first and second roller units 31 and 33 are located in generally parallel relation to one another and provide a shallow "V" to reduce any tendency for the drive wheels 13 and 15 to wander off the roller units 31 and 33.

In order to facilitate the application of opposing load or torque to the rollers 41, 45, 51, and 55, means are provided for applying opposing torque or load in response to the application of pressure fluid. While various other constructions can be employed, in the disclosed construction, the output shafts 43, 47, 53, and 57 have respectively mounted thereon suitable disks 61, 63, 65, and 67, and the disks have respectively associated therewith respective brake calipers 71, 73, 75, and 77 which apply to the disks 61, 63, 65, and 67 a frictional load or torque in opposition to the driving load or torque delivered through the rollers 41, 45, 51, and 55 by the vehicle drive wheels 13 and 15. While other arrangements are possible, it is preferred to use only the brake calipers 71 and 75 when applying a constant load in opposition to the torque delivered by the wheels. However, during "drive-on" and "drive-off" usage, all four brake calipers are employed. However, if desired, all four brake calipers could be used in the application of constant torque. Preferably, the brake calipers 71 and 75 are located on opposite sides of the disks 61 and 65 while the brake calipers 73 and 77 are mounted on the same side of the disks 63 and 67. The brake calipers 73 and 77 are mounted on the frame 21 in position to engage the disks 63 and 67 while the mounting of the brake calipers 71 and 75 will be disclosed hereinafter.

Because the drive mechanisms employed in most vehicles permit the drive wheels 13 and 15 to rotate at different speeds if the drive wheels 13 and 15 encounter different conditions, in the disclosed construction, the output shafts 43 and 53 are tied together by a universal coupling 81 for rotation at a common speed and for equal power delivery by the drive wheels 13 and 15 to each of the disks 61, 63, 65, and 67.

In order to sense an imbalance between the torque delivered by the drive wheels 13 and 15 and the torque applied by the brake calipers 71 and 75, means are provided for sensing differential between the driving torque or load and the applied torque or load. While various constructions can be employed, in the disclosed construction, the brake calipers 71 and 75 are fixedly mounted on a movable sub-frame or cross beam 91 which is pivotally suspended by a pair of bearings 93 and 95 respectively carried by the output shafts 43 and 53 on which the disks 61 and 65 are fixed. As a consequence, when the driving load, i.e., the load applied by the drive wheels 13 and 15 of the vehicle and the applied load, i.e., the load applied by the brake calipers 71 and 75, are equal, i.e., the driving load and the applied load are balanced, the cross beam 91 will be located in a centered position. However, if the applied and driving loads are out-of-balance, the sub-frame or cross beam 91 will move from the centered position. Specifically, if the applied load is lesser than the driving load, the cross beam 91 will tend to rotate relative to the frame 21 in one direction and if the applied load is greater than the driving load, the cross beam 91 will tend to rotate relative to the frame 21 in the opposite direction.

Figure 2:
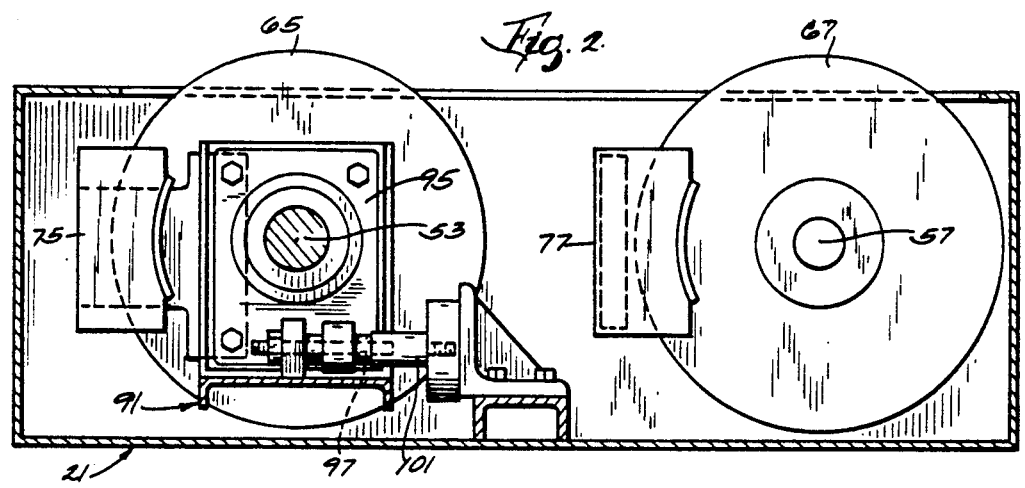
FIG. 2 is an enlarged sectional view taken along line 2—2 of FIG. 1.
Figure 3:
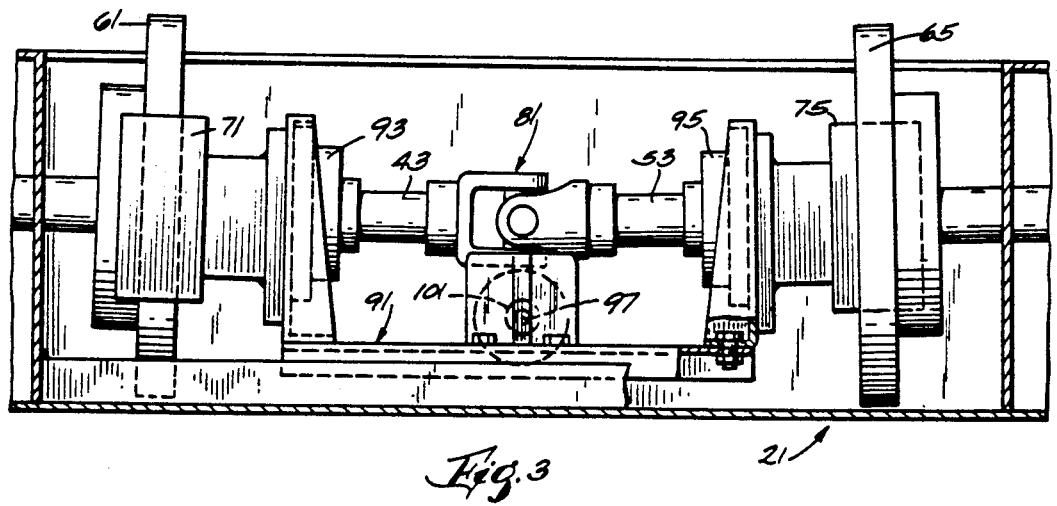
FIG. 3 is an enlarged fragmentary view taken along line 3—3 of FIG. 1.

Means are provided for generating a signal proportional to the balance condition of the driving and applied loads, i.e., to the torque differential, if any, between the driving and applied loads. While other arrangements can be employed, in the disclosed construction, such means comprises (See FIG. 2) a force transmitting stud 97 which fixedly extends from the pivotal sub-frame or cross beam 91 and which is in engagement with a transducer, or load cell, or force sensor 101 having a center or null-point, i.e., a transducer which produces a first or positive signal on one side of a center point and a second, or other, or negative signal, i.e., an opposing signal, on the opposite side of the center point, which signals are proportional to the distance from the center point. Various center-point transducers are commercially available and need not further be described.

Because the load applied by the brake calipers can vary at any given rotational speed and at any given applied air pressure due to various uncontrollable factors such as moisture, dirt, and grease or oil, means are also provided for maintaining the applied torque at a constant magnitude for a given speed by regulating the pressure of the fluid applied to the brake calipers. Such means comprises pressure regulating means for adjustably varying the pressure of the air applied to the brake calipers. While other constructions can be employed, in the disclosed construction, the brake calipers 71, 73, 75, and 77 have operably associated therewith respective pressure regulators 72, 74, 76, and 78 which can be suitably mounted on the frame 21 and which, in turn, are suitably connected to a source 125 of pressurized air. Alternatively, if desired, a single pressure regulator operatively connected to all of the brake calipers 71, 73, 75, and 77 can be employed. In addition, such means comprises an electronic control 111 (shown schematically) which is operably connected to the transducer 101 and to the pressure regulators 72 and 76, which applies the output signal of the transducer 101 to an electronic reference or comparator (not shown) and which generates an output or feedback signal which is applied to the pressure regulators 72 and 76, associated respectively with the brake calipers 71 and 75 to increase or decrease the air pressure applied at the brake calipers 71 and 75 so that, for a given rotational speed, the frictional load applied by the brake calipers 71 and 75 is maintained constant i.e., balances the driving load (given the speed of the vehicle is maintained constant by the vehicle operator). It is believed that electronic circuits for receiving the transducer input signal and generating a feedback output signal in relation to a reference or reference value are well known in the art and can be readily constructed by those skilled in the art. Accordingly, further description is believed to be unnecessary. The air pressure applied to the brake calipers can also be manually varied or can be varied by mechanical or electrical adjustment.

In order to adapt the apparatus for use with automobiles of differing size, i.e., with differing horsepowers, a plurality of testing levels can be employed. More particularly, engines of higher horsepower will develop a greater driving torque or load at a given speed than engines of lesser horsepower. Accordingly, the disclosed apparatus includes a plurality of references or comparators, and means for selectively connecting the transducer signal to a selected one of the references or comparators which has been programmed for the appropriate horsepower size of the driving engine.

While the control does not require a speed input because the driver of the car is expected to "drive" at a constant designated speed, nevertheless, the test apparatus 11 includes means for measuring speed of rotation of at least one of the disks 61, 63, 65, and 67 to assure the operator of the testing apparatus or device 11 that the (vehicle) speed is, in fact, constant, or nearly so. Furthermore, other segments of an enlarged overall testing apparatus, not shown or germain to this invention, may use a speed input. Accordingly, at least one of the disks 61, 63, 65, and 67 is provided with a series of teeth or other signal generating means 119 which pass a sensor 121 arranged in electrical circuit with a digital readout meter or device 123 adapted to indicate the vehicle speed. Various other suitable arrangements can also be employed for detecting rotational speed and any suitable arrangement can be employed for converting rotational speed into vehicle speed.

Various of the features of the invention are set forth in the following claims.

We claim:

1. A vehicle testing apparatus comprising means operable in response to the application of pressure fluid for applying torque in opposition to driving torque delivered by the driving wheels of a vehicle operating at a given speed, means for sensing differential in the driving and applied torque, means for generating a signal proportional to the torque differential, and means for varying the pressure of the applied fluid to maintain the applied torque at a constant magnitude.

2. A vehicle testing apparatus in accordance with claim 1 wherein said pressure varying means includes a reference to which said signal is compared.

3. A vehicle testing apparatus in accordance with claim 2 wherein said reference is adjustable.

4. A vehicle testing apparatus in accordance with claim 3 and further including a plurality of references, and means for selecting one of said references.

5. A vehicle testing apparatus in accordance with claim 1 and wherein said torque applying means comprises
a frame,
a roller rotatably supported by said frame, adapted to be engaged by one of the driving wheels and to be rotatably driven incident to receipt of driving torque transmitted by the one driving wheel, and
a pressure fluid actuated device operable to apply torque in opposition to the rotation of said driven roller, and
wherein said differential sensing and signal generating means comprises
a bracket pivotally supported by said frame, carrying said pressure fluid actuated device, and including a force transmitting stud, and
a force sensor stationarily mounted on said frame in position for engagement by said stud for generating a signal representative of the out-of-balance condition between the driving torque and the applied torque.

6. A vehicle testing apparatus in accordance with claim 5 wherein said torque differential sensing means further comprises a disk rotatably driven by said driven roller at a speed proportional to the rate of vehicle wheel rotation, and wherein said pressure fluid actuated device applies friction to said disk.

7. A vehicle testing apparatus comprising a pressure air brake caliper for applying torque in opposition to driving torque delivered by the driving wheels of a vehicle operating at a given speed, means for sensing differential in the driving and applied torque, means for generating a signal representative of the torque differential, and means for maintaining the applied torque at a constant magnitude by regulating the pressure of the pressure air.

8. A vehicle testing apparatus in accordance with claim 7 wherein said pressure varying means includes a source of pressure air, a signal-operated pressure regulator operably connected between said pressure source and said brake caliper, and an electronic control receiving the torque differential signal and including means for generating, in response to receipt of the torque differential signal, a feedback signal which is applied to said pressure regulator.

9. A vehicle testing apparatus in accordance with claim 8 wherein said electronic control includes a plurality of references to which the torque differential signal is comparable, and for means for selecting one of said references.

10. A vehicle testing apparatus comprising
a frame,
a pair of rollers rotatably supported by said frame, adapted to be respectively engaged by a pair of driving wheels of a vehicle and to be rotatably driven incident to receipt of driving torque transmitted by the driving wheels, and coupled to each other for common rotation, a pair of disks respectively rotatably driven by said driven rollers at a speed proportional to the rate of driving wheel rotation, a pair of pressure air actuated brake calipers respectively engaging said disks to frictionally apply torque in opposition to the rotation of said driven rollers, a bracket pivotally supported by said driven rollers, carrying said brake calipers, and including a force transmitting stud, a force sensor stationarily mounted on said frame in position for engagement by said stud for generating a signal representative of the out-of-balance condition between the driving torque and the applied torque, a source of pressure air, a signal-operated pressure regulator operably connected between said pressure source and said brake calipers, and an electronic control receiving the out-of-balance signal from said sensor and including means for generating, in response to receipt of the signal from said sensor, a feedback signal which is applied to said pressure regulator, whereby to maintain said applied torque at a constant magnitude.

11. A vehicle testing apparatus in accordance with claim 10 wherein said electronic control includes a reference to which the out-of-balance signal is compared.

12. A vehicle testing apparatus in accordance with claim 11 wherein said reference is adjustable.

13. A vehicle testing apparatus in accordance with claim 12 wherein said electronic control further includes a plurality of references, and means for selecting one of said references.

14. A vehicle testing apparatus comprising pressure air means for applying torque in opposition to driving torque delivered by the driving wheels of a vehicle operating at a given speed, means for sensing differential in the driving and applied torque, means for generating a signal representative of the torque differential, and means for maintaining the applied torque at a constant magnitude by regulating the pressure of the pressure air.

* * * * *